Patented July 7, 1942

2,289,185

UNITED STATES PATENT OFFICE 2,289,185

TREATMENT OF RUBBER

Harry L. Fisher, Stamford, Conn., assignor to United States Rubber Company, New York, N. Y., a corporation of New Jersey No Drawing. Application July 11, 1939,
Serial No. 283,831

12 Claims. (Cl. 260—773)

This case is a continuation-in-part of case Serial No. 728,311, filed May 31, 1934, (now Patent No. 2,170,191, dated Aug. 22, 1939).

This invention relates to the treatment of rubber and similar vulcanizable materials, and more particularly to methods of improving the properties thereof, and the resulting products.

An object of the invention is to provide a class of new rubber derivatives. Another object is to provide a new class of vulcanizing agents, that is, a class of compounds which are capable of vulcanizing rubber to a condition similar to that hitherto obtained by using sulphur as the vulcanizing means. Further objects will be apparent from the following description.

The invention broadly relates to the vulcanization of rubber by means of the combined action of a leuco base of a quinone-imine compound of the benzene and naphthalene series, and an oxidizing agent.

By leuco-base of a quinone-imine compound is meant a compound which is capable of being transformed by mild oxidation into a quinone-imine compound.

Examples of such leuco bases are the following:

(1) Ortho- and para-aminophenols (HO—Ar—NH—R) where R is H, or an alkyl, aryl, or aralkyl group, for example, p-cyclohexylaminophenol, o-aminophenol, p-aminophenol, p-methylaminophenol, p-benzylaminophenol, and monohydroxy-diarylamines, e. g., p-hydroxy-diphenyl-amine; ortho and para primary diamines ($H_2N$—Ar—$NH_2$), e. g., p-phenylene-diamine, benzidine, and homologues and analogues, thereof; polyhydroxy-diarylamines, including those containing at least one ortho or para hydroxy substituent on each aryl nucleus (HO—Ar—NH—Ar—OH) where the Ar's are similar or dissimilar; mixtures of phenols (including naphthols) with para-diamines, which mixtures may be converted into indophenols; dihydroxy-azo-aromatic hydrocarbons (HO—Ar—N=N—Ar'—OH); mixed primary - secondary aromatic amines (R—NH—Ar—$NH_2$), R being an alkyl, aryl or aralkyl group, e. g., p-amino-diphenylamine, p-amino-phenyl-p-tolylamine; aromatic amines containing at least two secondary amino groups, two of the secondary amino groups being joined to the same aromatic ring structure in positions ortho or para to each other; e. g., N,N'-diphenyl-p-phenylene diamine, N,N'-di-alpha-naphthyl-p-phenylene diamine, N,N'-dibeta-naphthyl-p-phenylene diamine, N,N'-diphenyl-benzidine, N,N'-dibenzyl-benzidine, N,N'-di-cyclohexyl benzidine, N,N'-di-beta-naphthyl benzidine; mixtures of primary aromatic amines with aromatic diamines, which mixtures may be converted into indamines; primary ortho- or para-diamino-azo aromatic hydrocarbons ($H_2N$—Ar—N=N—Ar'—$NH_2$); secondary ortho- or para-diamino azo aromatic hydrocarbons (R—NH—Ar—N=N—Ar'—NH—R), R being an alkyl, aryl, or aralkyl group; acidyl derivatives of such "leuco-bases" mentioned in this paragraph as contain a primary amino group, especially of the diamines, exemplified by N-p-tolyl-N'-p-toluene-sulfonyl-p-phenylenediamine and p,p'-di-p-toluene-sulfonyl-p-phenylenediamine.

Results therewith are shown as follows:

| Vulcanizing agents, etc., in 100 parts rubber | Parts by weight | Minutes press cure at 141° C. | T | E |
|---|---|---|---|---|
| | | | $Kg./cm.^2$ | $Kg./cm.^2$ |
| o-Aminophenol | 10 | 30 | 7.9 | 1,100 |
| Manganese dioxide | 20 | 90 | 13.1 | 830 |
| | | 150 | 16.6 | 790 |
| p-Phenylene diamine | 10 | 30 | 4.5 | 670 |
| mercuric oxide (yellow) | 40 | 90 | 14.6 | 650 |
| p-Hydroxy-diphenylamine | 7.5 | 90 | 71.5 | 800 |
| Manganese dioxide | 20 | 150 | 128 | 710 |
| p-Hydroxy-diphenylamine | 7 | 90 | 171 | 480 |
| Manganese dioxide | 20 | 150 | 224 | 420 |
| Carbon black | 40 | | | |
| p-Hydroxy-diphenylamine | 5 | 30 | 8 | 760 |
| Vanadium pentoxide | 25 | 90 | 88 | 830 |
| | | 150 | 135 | 800 |
| p-Benzylaminophenol | 10 | 30 | 4.5 | 760 |
| Manganese dioxide | 20 | 90 | 14.2 | 830 |
| | | 150 | 26.2 | 960 |
| N,N'- diphenyl - p - phenylene-diamine | 5 | 30 | 128 | 560 |
| Lead dioxide | 20 | 60 | 152 | 500 |
| | | 90 | 163.5 | 520 |
| | | 120 | 146 | 500 |
| | | 180 | 168 | 500 |
| N,N'-di-alpha-naphthyl-p-phenylene diamine | 7.5 | 30 | 49 | 830 |
| Mercuric oxide (yellow) | 30 | 90 | 116 | 700 |
| | | 150 | 125 | 620 |
| N,N'-di-beta-naphthyl-p-phenylene-diamine | 7.5 | 45 | 118 | 550 |
| Lead dioxide | 30 | 90 | 141 | 510 |
| | | 135 | 179 | 510 |
| | | 180 | 160 | 520 |
| N,N'-di-beta-naphthyl-p-phenylene-diamine | 7 | 90 | 181 | 530 |
| Manganese dioxide | 30 | 120 | 191 | 510 |
| N,N'-di-beta-naphthyl-p-phenylene diamine | 7.5 | 30 | 131 | 530 |
| Lead dioxide | 20 | 60 | 146 | 500 |
| Whiting | 50 | 120 | 151 | 500 |
| Zinc oxide | 10 | | | |
| Ferric oxide | 50 | | | |
| Titanium dioxide | 5 | | | |
| Petrolatum | 7 | | | |
| N,N'-di-beta-naphthyl-p-phenylene-diamine | 7.5 | 60 | 163 | 480 |
| Lead dioxide | 25 | 90 | 173 | 470 |
| Lithopone | 70 | 120 | 173 | 470 |
| | | 150 | 171 | 480 |
| N,N'-di-beta-naphthyl-p-phenylene-diamine | 7.5 | 45 | 205 | 480 |
| Mercuric oxide (yellow) | 30 | 75 | 278 | 490 |
| Carbon black | 40 | 120 | 236 | 370 |
| Zinc laurate | 3 | 150 | 231 | 330 |
| N,N'-di-beta-naphthyl-p-phenylene-diamine | 7.5 | 30 | 168 | 410 |
| Lead dioxide | 20 | 60 | 193 | 410 |
| Clay | 87.5 | 120 | 188 | 410 |
| Stearic acid | 2 | | | |

| Vulcanizing agents, etc., in 100 parts rubber | Parts by weight | Minutes press cure at 141° C. | T | E |
|---|---|---|---|---|
| | | | $Kg./cm.^2$ | $Kg./cm.^2$ |
| N,N'-di-beta-naphthyl-p-phenylene-diamine | 7.5 | *60 | 80 | 260 |
| Lead dioxide | 25 | *120 | 96 | 230 |
| Clay | 100 | *180 | 111 | 240 |
| Zinc oxide | 100 | | | |
| Paraffin oil | 3 | | | |
| N,N'-dibenzyl-benzidine | 10 | 30 | 57 | 680 |
| Mercuric oxide (yellow) | 40 | 90 | 104 | 580 |
| N,N'-di-beta-naphthyl-benzidine | 10 | 30 | 73 | 560 |
| Lead dioxide | 20 | 90 | 44 | 410 |
| | | 150 | 26.5 | 320 |
| p-Amino-diphenylamine | 10 | 60 | 43 | 870 |
| Manganese dioxide | 20 | 120 | 95 | 800 |
| p-Aminophenyl-p-tolylamine | 10 | 120 | 37.5 | 850 |
| Manganese dioxide | 20 | | | |
| p,p'-Di-p-toluenesulfonyl-p-phenylenediamine | 10 | 30 | 52.7 | 790 |
| Lead dioxide | 20 | 90 | 52.3 | 770 |
| | | 150 | 26.8 | 660 |

T is tensile strength, and E percent elongation at break.
*Wrapped around a mandrel and cured in soapstone with steam at 141° C.

(2) Primary and secondary aromatic monamines free of phenolic hydroxyl groups and unsubstituted in at least one ortho or para position, chiefly those having a free para position. Examples are aniline, o-toluidine, meta-toluidine, p-toluidine, alpha-naphthylamine, beta-naphthylamine, amino-biphenyl, diphenylamine, di-o-tolylamine, di-alpha-naphthylamine, di-beta-naphthylamine, phenyl-alpha-naphthylamine, phenyl-beta-naphthylamine.

Results are shown by the following tests:

| Vulcanizing agents, etc., in 100 parts rubber | Parts by weight | Minutes press cure at 141° C. | T | E |
|---|---|---|---|---|
| | | | $Kg./cm.^2$ | $Kg./cm.^2$ |
| Aniline | 5 | 90 | 26 | 910 |
| Mercuric oxide (yellow) | 20 | 150 | 48 | 860 |
| Aniline | 7.5 | 30 | 65 | 760 |
| Manganese dioxide | 30 | 90 | 65 | 570 |
| | | 150 | 67 | 560 |
| o-Toluidine | 7.5 | 90 | 39 | 850 |
| Mercuric oxide (yellow) | 30 | 150 | 57 | 800 |
| o-Toluidine | 7.5 | 30 | 71 | 760 |
| Manganese dioxide | 30 | 90 | 85 | 640 |
| | | 150 | 80 | 600 |
| o-Toluidine | 7.5 | 90 | 36 | 810 |
| Mercuric oxide (yellow) | 30 | 150 | 45 | 780 |
| p-Toluidine | 7.5 | 90 | 46 | 760 |
| Mercuric oxide (yellow) | 30 | 150 | 57 | 740 |
| Alpha-naphthylamine | 7.5 | 30 | 8 | 480 |
| Mercuric oxide (yellow) | 30 | 90 | 42 | 670 |
| | | 150 | 53 | 640 |
| Beta-naphthylamine | 7.5 | 90 | 10 | 560 |
| Mercuric oxide (yellow) | 30 | 150 | 26 | 670 |
| Diphenylamine | 5 | 90 | 42 | 820 |
| Mercuric oxide (yellow) | 20 | 150 | 66 | 780 |
| Diphenylamine | 7.5 | 30 | 41 | 730 |
| Manganese dioxide | 30 | 90 | 74 | 630 |
| | | 150 | 81 | 580 |
| Phenyl-alpha-naphthylamine | 10 | 90 | 9 | 630 |
| Mercuric oxide (yellow) | 40 | 150 | 23 | 780 |
| Phenyl-alpha-naphthylamine | 10 | 30 | 8 | 700 |
| Manganese dioxide | 30 | 90 | 42 | 780 |
| | | 150 | 57 | 750 |
| Phenyl-beta-naphthylamine | 10 | 150 | 10 | 660 |
| Mercuric oxide (yellow) | 40 | | | |

The vulcanizing activity of class (2) compounds is probably due to the introduction of a hydroxyl group in a position ortho or para to an amino group, and further oxidation of the resulting amino-phenol compound to a quinone-mono-imine, thus:

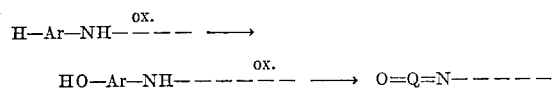

Wherever the term aryl, aralkyl, alkyl or arylene occurs herein, it is to be understood unless otherwise specified as meaning either the unsubstituted or substituted hydrocarbon groups such as those that contain substituents such as hydroxy, alkoxy, acidyl, halogen, amino radicals, etc.

It is further to be understood that the terms "quinonoid nucleus," "benzene series," "aryl," "arylene" comprehend groups containing two distinct but directly connected benzene rings, e. g., groups derived from biphenyl, and that the term "alkyl" includes saturated and unsaturated monovalent radicals of the aliphatic and the alicyclic series.

The amounts of the respective leuco bases usable ordinarily vary from about 5 parts to about 10 parts by weight based on 100 parts of rubber.

The amounts of the respective oxidizing agents may vary from about 10 to about 40 parts and higher by weight per 100 parts by weight of rubber. These proportions are but illustrative, and may be varied according to the type of rubber and compounding ingredients in order to obtain the optimum cure in each case. Instead of using a single oxidizing agent, mixtures of the same may be used.

The use of an oxidizing agent with the various chemicals disclosed, in giving improved ageing characteristics, would ordinarily be considered at variance with the general ideas of preserving rubber per se or sulphur-rubber vulcanizates. It is customary to choose as antioxidants, substances of a reducing character rather than of an oxidizing character. Since the oxidizing influences at work during the wear and tear of usage are to be combated, it would apparently be inconsistent to actually incorporate an oxidizer into the rubber which might hasten its deterioration. According to the above theory, however, the oxidizing agent apparently does not attack the rubber hydrocarbon, but is used to form quinone-imine for or in combination with the rubber. Whether or not the theory is correct, the fact is that by this invention, rubber products are obtained having satisfactory ageing characteristics.

The preferred oxidizing agents are those containing oxygen and a multivalent metal, in which the metal is in a higher state of oxidation; for example, lead dioxide, manganese dioxide, mercuric oxide (preferably yellow), lead chromate, vanadium pentoxide, and the like. In some cases the mix may be set aside in powdered oxidizing agent for several days to vulcanize at room temperature.

The use of an oxidizing agent is not to be confused with the use of those basic oxides or amines which are not recognized to be oxidizing agents for organic compounds, e. g., zinc oxide, magnesium oxide, calcium hydroxide, urea and its derivatives, but which activate or aid in activating vulcanization, and therefore may be used for the purpose of non-oxidizing activators in the vulcanization process.

The new vulcanized products, like rubber-sulphur vulcanizates, are characterized, as distinguished from raw rubber, by a low permanent set, increased tensile strength, reduced elongation at break, substantial insolubility in the common rubber solvents (e. g. gasoline, benzene, solvent naphtha, chloroform, etc.), and retention of elastic properties at lower temperatures. Various manufactured compounded rubber products made by the use of this invention have high resistance to abrasion and heat and to other destructive influences such as tearing, cutting, flexing, stretching, compression, and oil and water absorption. Examples of various products are, high carbon black stocks such as tire tread compositions, vibration-absorbing elements such as motor mountings and the like, tubes, hose, belting, packing, dipped rubber articles, thread uncovered or covered with yarn, threads or filaments such as cotton, silk, wool, etc., rubber coated fabrics, gaiters and other composite rubber and fabric articles and goods, associated or not with metals.

The rubber compounds may be mechanically processed to any desired form or shape, as by calendering, molding, tubing, extruding, etc. Latex whether of natural origin or artificially prepared from crude rubber, to which the chemicals are added, may be spread, extruded or otherwise treated, before, during or after vulcanization to provide vulcanized rubber articles, coatings, filaments, or threads. In compounding or vulcanizing latex with the new vulcanizing agents, the practices employed where sulphur is the vulcanizing agent, may be followed.

The chemicals may be applied for the vulcanization of natural rubbers and artificially prepared rubbers which are adaptable to vulcanization with sulphur, including reclaims and latices of such rubbers.

Various methods of cure may be used with the invention, e. g., mold, press, soapstone, water, steam and air cures.

It is to be understood that the invention is not to be limited by any theories or statements advanced by way of explanation, and that various modifications will occur to those skilled in the art in the manner of procedure and proportions of materials, for example while the vulcanizing agents of this invention are intended to displace the use of sulphur it may be desirable in some cases to use sulphur or other known vulcanizing agents therewith—all without departing from the spirit of the invention and the scope of the appended claims.

Having thus described my invention, what I claim and desire to protect by Letters Patent is:

1. A process of producing vulcanized rubber which comprises effecting vulcanization of the rubber by means of a "leuco base" of a quinone-imine compound chosen from the class consisting of the benzene, and naphthalene series, and an inorganic oxidizing agent for the "leuco-base" incorporated in the rubber prior to vulcanization.

2. A process of producing vulcanized rubber which comprises effecting vulcanization of the rubber by means of an amino phenol having at least one replaceable hydrogen atom attached to the amino-nitrogen atom, and an inorganic oxidizing agent incorporated in the rubber prior to vulcanization.

3. A process of producing vulcanized rubber which comprises preparing a rubber mix containing a hydroxy diarylamine chosen from the class consisting of the benzene and naphthalene series, and an inorganic oxidizing agent, heating said mix and effecting vulcanization of the rubber by means of the action of the hydroxy diarylamine with the oxidizing agent.

4. A process of producing vulcanized rubber which comprises effecting vulcanization of the rubber by means of para-hydroxy diphenylamine, and an inorganic oxidizing agent.

5. A process of producing vulcanized rubber which comprises effecting vulcanization of the rubber by means of an aromatic polyamine containing at least two secondary amino groups attached to the same aromatic nucleus of the benzene series, and an inorganic oxidizing agent.

6. A process of producing vulcanized rubber which comprises preparing a rubber mix containing an aromatic amine containing both primary and secondary amino groups, and an inorganic oxidizing agent, heating said mix and effecting vulcanization of the rubber by means of the action of said amine with the oxidizing agent.

7. A process of producing vulcanized rubber which comprises effecting vulcanization of the rubber by means of a di-secondary aromatic amine, and an inorganic oxidizing agent.

8. A process of producing vulcanized rubber which comprises effecting vulcanization of the rubber by means of an N,N'-diaryl-para-phenylene diamine, and an inorganic oxidizing agent.

9. A rubber composition having incorporated therein a "leuco" base of a quinoneimine compound chosen from the class consisting of the benzene, and naphthalene series, and an inorganic oxidizing agent for the "leuco-base."

10. A process which comprises incorporating in rubber a "leuco base" of a quinone-imine compound chosen from the class consisting of the benzene, and naphthalene series and also an inorganic oxidizing agent in an amount effective to convert the "leuco-base" to a quinone-imine compound, heating the mix, and inducing vulcanization of the rubber by the action of the "leuco base" with the oxidizing agent.

11. A process which comprises incorporating in rubber a di-secondary aromatic amine and also an inorganic oxidizing agent in an amount effective to convert said amine to a quinone-imine compound, heating the mix, and inducing vulcanization of the rubber by the action of said amine with the oxidizing agent.

12. A process which comprises incorporating in rubber a "leuco base" of a quinone-imine compound chosen from the class consisting of the benzene, and naphthalene series and also an oxidizing agent containing oxygen and a multivalent metal in an amount effective to convert the "leuco-base" to a quinone-imine compound, heating the mix, and inducing vulcanization of the rubber by the action of the "leuco base" with the oxidizing agent.

HARRY L. FISHER.